US008686519B2

(12) United States Patent
Langereis et al.

(10) Patent No.: US 8,686,519 B2
(45) Date of Patent: Apr. 1, 2014

(54) MEMS ACCELEROMETER USING CAPACITIVE SENSING AND PRODUCTION METHOD THEREOF

(76) Inventors: Geert Langereis, Eidhoven (NL); Iris Bominaar-Silkens, Valkenswaard (NL); Twan Van Lippen, Bladel (NL)

(*) Notice: Subject to any disclaimer, the term of this patent is extended or adjusted under 35 U.S.C. 154(b) by 0 days.

(21) Appl. No.: 13/576,184

(22) PCT Filed: Jan. 25, 2011

(86) PCT No.: PCT/IB2011/050320
§ 371 (c)(1),
(2), (4) Date: Jul. 31, 2012

(87) PCT Pub. No.: WO2011/098930
PCT Pub. Date: Aug. 18, 2011

(65) Prior Publication Data
US 2012/0299130 A1    Nov. 29, 2012

(30) Foreign Application Priority Data
Feb. 12, 2010  (EP) .................................. 10153512

(51) Int. Cl.
*H01L 29/84*  (2006.01)
(52) U.S. Cl.
USPC ............. 257/415; 257/347; 257/774; 438/50; 438/667; 438/668
(58) Field of Classification Search
USPC ........... 257/E29.324, E29.287, 774, 775, 347, 257/349, 776, 415; 438/149, 150, 151, 152, 438/153, 154, 155, 156, 157, 158, 159, 160, 438/161, 162, 163, 164, 165, 295, 311, 404, 438/402, 403, 405, 406, 407, 408, 409, 410, 438/411, 413, 458, 459, 479, 480, 481, 967, 438/50, 52, 629, 637, 638, 639, 640, 667, 438/668, 672, 675, 700, 701, 713, 978
See application file for complete search history.

(56) References Cited

U.S. PATENT DOCUMENTS

| 2002/0014126 | A1 | 2/2002 | Okada |
| 2003/0235992 | A1 | 12/2003 | Ozawa |
| 2009/0166772 | A1* | 7/2009 | Hsieh et al. .................. 257/415 |
| 2010/0164025 | A1* | 7/2010 | Yang ............................. 257/416 |
| 2011/0123052 | A1 | 5/2011 | Bominaar-Silkens et al. |
| 2012/0033832 | A1 | 2/2012 | Van Lippen et al. |

FOREIGN PATENT DOCUMENTS

| EP | 0480471 A2 | 10/1991 |
| WO | 2009/063473 A2 | 5/2009 |

OTHER PUBLICATIONS

International Search Report and Written Opinion for Int'l. Patent Application No. PCT/IB2011/050320 (Apr. 8, 2011).

* cited by examiner

*Primary Examiner* — Thanh Y Tran (57) ABSTRACT

A MEMS accelerometer uses capacitive sensing between two electrode layers. One of the electrode layers has at least four independent electrodes arranged as two pairs of electrodes, with one pair aligned orthogonally to the other such that tilting of the membrane can be detected as well as normal-direction movement of the membrane. In this way, a three axis accelerometer can be formed from a single suspended mass, and by sensing using a set of capacitor electrodes which are all in the same plane. This means the fabrication is simple and is compatible with other MEMS manufacturing processes, such as MEMS microphones.

20 Claims, 9 Drawing Sheets

MEMS ACCELEROMETER USING CAPACITIVE SENSING AND PRODUCTION METHOD THEREOF

This invention relates to an accelerometer, and particularly an accelerometer fabricated using MEMS technology.

Micro Electro Mechanical Systems (MEMS) require large investments in a factory because of the non-conventional processing steps involved. Therefore, it is beneficial to re-use a MEMS flow to make other products. The re-use of (parts of) the flow will immediately translate into cost reduction.

An example of sharing technology is the integration of an accelerometer with a MEMS microphone. This has been proposed (but not yet published) by the applicant. This invention builds on this approach to enable the fabrication of a full 3D bulk-micromachined accelerometer (with better performance than surface-micromachined accelerometers due to the larger mass) using a process flow compatible with MEMS microphone manufacture. Thus, no significant further investments over the toolset of a MEMS microphone are required.

In one example, a MEMS microphone flow is characterized by:

a Silicon On Insulator (SOI) silicon substrate, with a thin top-silicon layer which defines a low stress membrane layer in the final device;

a through silicon etch, to create free standing membranes out of the SOI layer;

a sacrificial layer etch, preferably applied to a silicon-dioxide layer, preferably done by dry HF vapour etch, but alternatively done by wet chemical etching.

Figure 1:
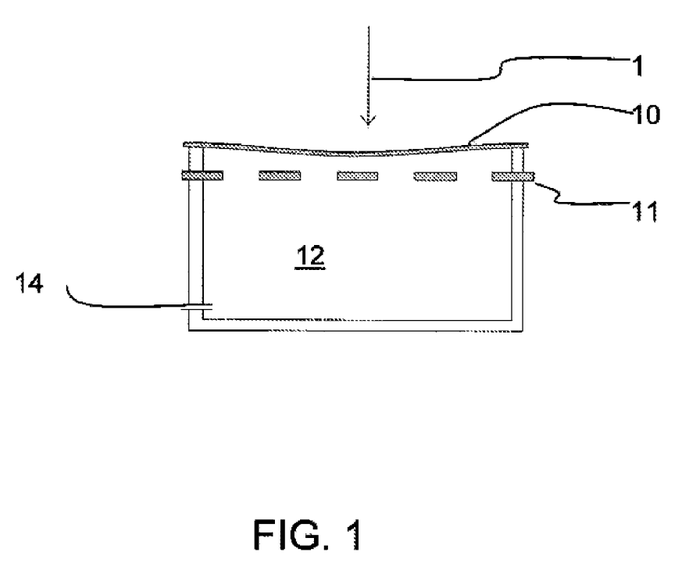
FIG. 1 shows schematically the principle of operation of a known capacitive microphone.

FIG. 1 shows schematically the principle of operation of a known capacitive microphone. Sound pressure waves 1 make a membrane 10 vibrate due to a pressure difference over the membrane. This varies the airgap spacing between the membrane 10 and a backplate 11. For a good omni-directional performance, the back side of the membrane faces an acoustically closed back chamber 12. A small hole 14 in the back chamber is required to compensate for slow changes in atmospheric pressure.

In order to detect the movement of the membrane, it is placed in a parallel plate capacitor set-up. To do so, the membrane has a conducting surface and the back-plate is also conducting, placed to create the air gap. An electrically detectable signal, proportional to the sound pressure, is available due to modulation of the air gap by the sound pressure difference.

The membrane and backplate are normally made in a silicon MEMS process while the back-chamber can be defined by the device package.

US 2002/014126 discloses a force detector which uses multiple electrodes to detect bending of a substrate, so that a direction of the detected force can also be derived.

US 2003/235992 discloses a capacitive acceleration sensor manufactured using a semiconductor manufacturing process.

WO 2009/063473 discloses a 3-dimensional MEMS accelerometer fabricated on a single planar substrate which deploys three co-planar sensor elements.

According to the invention, there is provided a MEMS accelerometer as claimed in claim 1.

The use of at least four electrodes enables tilting to be detected in two orthogonal directions. In this way, a three axis accelerometer can be formed which is compact and which used tried and tested bulk micromachining processes, as for example already used for the manufacture of MEMS microphones.

A portion of the substrate can be attached to the membrane, which portion defines a suspended mass isolated from the remainder of the substrate by the opening through the substrate. This provides an increased mass against which the force to be detected acts. This provides improved sensitivity compared to the application of force only to the membrane. It also provides increased tilting in response to in-plane forces, by situating the centre of gravity of the mass below the membrane layer, so that in-plane forces result in torsion, which in turn generates the tilting effect.

The substrate preferably comprises silicon.

The second electrode layer can for example comprise four quadrants which are supported from their outer periphery.

The invention also provides a method of forming a MEMS accelerometer as claimed in claim 5.

The substrate structure preferably comprises silicon-on-insulator substrate. The top silicon layer forms a membrane, the movement of which is to be detected.

Examples of the invention will now be described with reference to the accompanying drawings, in which.

The drawings are not to scale, and some dimensions may have been exaggerated (for example the thickness dimension) to make the drawings show the different components more clearly.

The invention provides a MEMS accelerometer using capacitive sensing between two electrode layers. One of the electrode layers has at least four independent electrodes arranged as two pairs of electrodes, with one pair aligned orthogonally to the other such that tilting of the membrane with a constant average spacing can be detected as well as movement of the membrane causing a change in average spacing. In this way, a three axis accelerometer can be formed from a single suspended mass (the mass of the membrane and any attached mass), and by sensing using a set of counter electrodes (i.e. one of the opposing electrodes of a capacitor) which are all in the same plane. This means the fabrication is simple and is compatible with other MEMS manufacturing processes, such as MEMS microphones.

A portion of the substrate can be attached to the membrane, which portion defines a suspended mass isolated from the remainder of the substrate by the opening through the substrate.

As mentioned above, the applicant has proposed the integration of a MEMS accelerometer with a MEMS microphone. The accelerometer has been proposed for "body noise" suppression.

Referring now to FIGS. 2A-2G, a method of manufacturing a MEMS microphone will be described, wherein an accelerometer mass-spring system is made entirely in the microphone backplate layer.

Figure 2A:
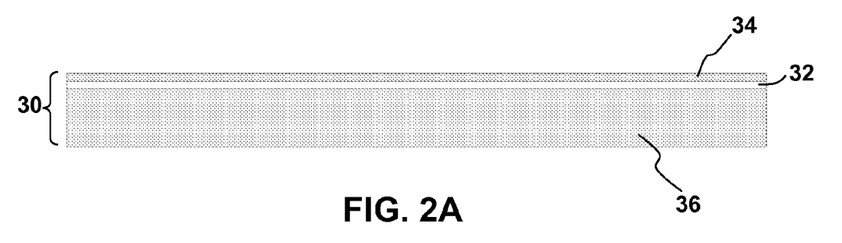
FIGS. 2A to 2G illustrate a method of manufacturing a MEMS microphone and accelerometer showing the basic approach of the invention.

Firstly, as shown in FIG. 2A, the process begins with the provision of a Silicon-on-Insulator (SOI) wafer substrate 30. Here the SOI wafer substrate 30 comprises a layer of Silicon Dioxide ($SiO_2$) 32 sandwiched between an upper 34 and lower 36 layer of Silicon (Si).

Figure 2B:
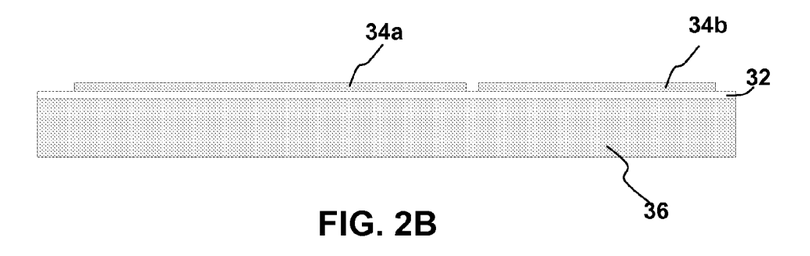

Next, the upper Si layer 34 is patterned so as to provide first 34a and second 34b portions as shown in FIG. 2B. This first portion 34a of the Si layer 34 will become the microphone membrane and the second portion 34b of the Si layer 34 will become a fixed electrode of the accelerometer. The SOI wafer 30 ensures that the stress of this layer is low tensile so as to produce a sensitive microphone since the microphone sensitivity is determined by the (tensile) stress in the membrane.

Figure 2C:
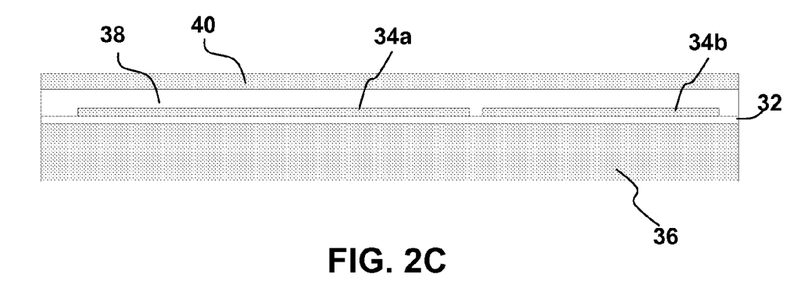

As shown in FIG. 2C, an additional Silicon Dioxide ($SiO_2$) (for example TEOS or LPCVD) layer 38 is deposited over the patterned upper layer 34 and then subsequently covered with a polysilicon layer 40. As will be shown later, the region of the polysilicon layer 40 above first portion 34a of the Si layer 34 will form the backplate of the microphone, and the region of the polysilicon layer 40 above second portion 34b of the Si layer will form the suspended mass of the accelerometer.

Figure 2D:
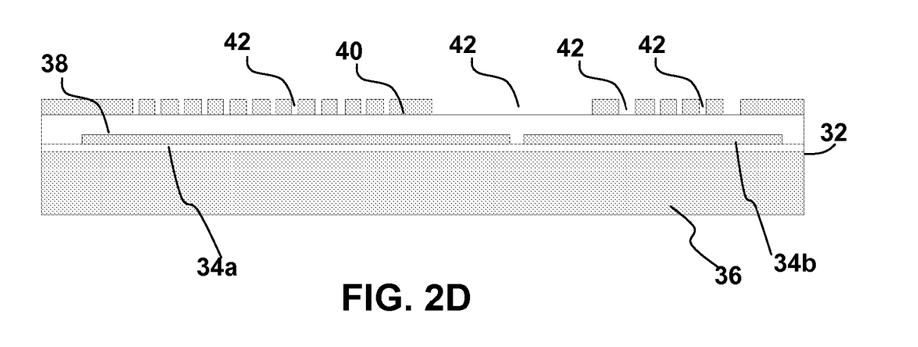

Holes 42 are then etched in the polysilicon layer 40 (using a reactive ion etch process for example) as shown in FIG. 2D. These holes 42 are provided for a subsequent sacrificial layer etching process. Further, the holes 42 are also provided to make the backplate of the microphone acoustically transparent.

Figure 2E:
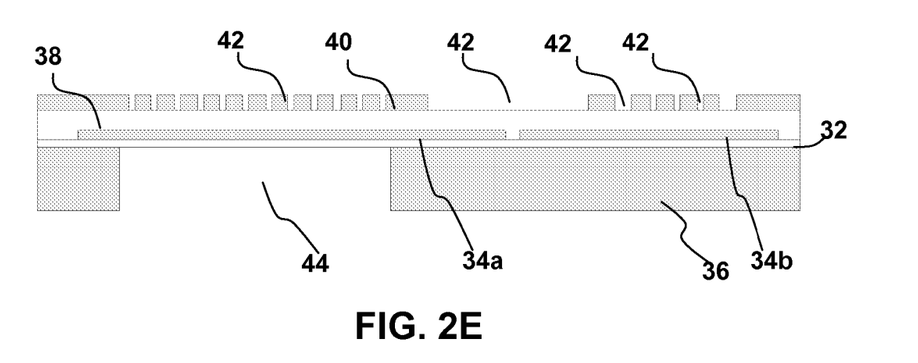

Next, using Deep Reactive Ion Etching (DRIE), or alternatively wet anisotropic etching in KOH or TMAH, a portion of the lower 36 layer of Silicon (Si) is etched away so as to form a cavity 44 at the position of the microphone, as shown in FIG. 2E.

Figure 2F:
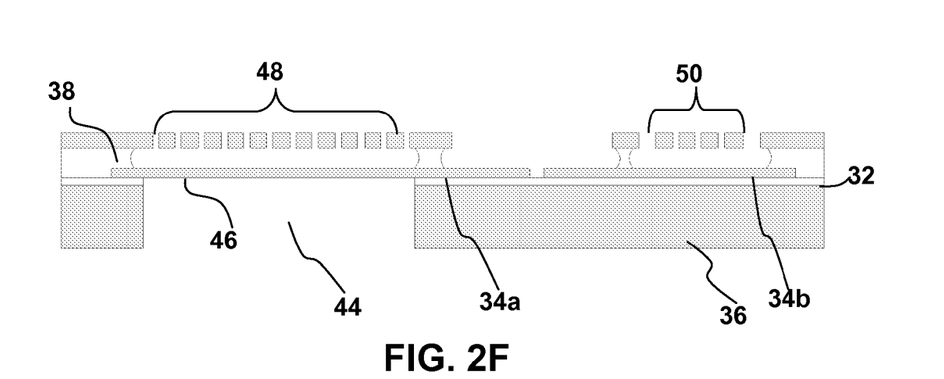

A sacrificial layer etching process is then undertaken through the holes 42 to remove portions of the $SiO_2$ layer 38 as shown in FIG. 2F. This releases the first portion 34a Si layer 34 from the region of the polysilicon layer 40 above it, thereby forming a membrane portion 46 from the first portion 34a of the Si layer 34, and forming a backplate 48 from the region of the polysilicon layer 40 above it. In addition, the region of the polysilicon layer 40 above second portion 34b of the Si layer 34 is released from the Si layer 34 so as to form the suspended mass 50 of the accelerometer.

Figure 2G:
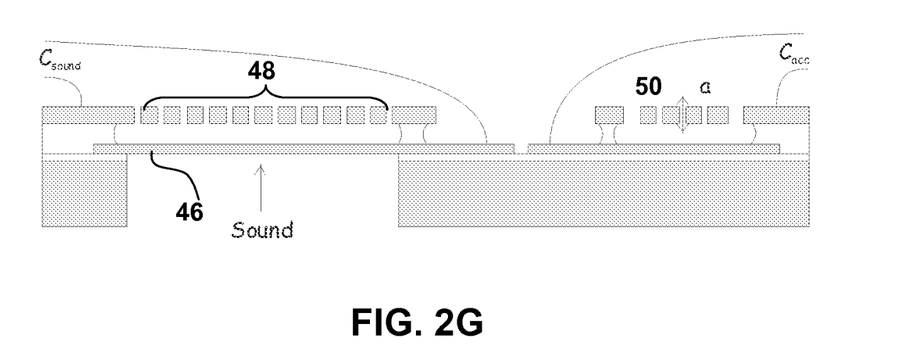

Thus, the final structure shown in FIG. 2G comprise a MEMS capacitive microphone (on the left side) and a MEMS capacitive accelerometer (on the right side). The capacitance Csound between the electrically conductive surfaces of the membrane 46 and backplate 48 provides a measure of an incident acoustic signal and the mechanical vibrations of the device. Similarly, the capacitance Cacc between the electrically conductive surfaces of the suspended mass 50 and the second portion 34b of the Si layer 34 provides a measure of mechanical vibrations (depicted by the arrow labelled "a") of the microphone.

It will be appreciated that the manufacturing process described above requires no additional masks when compared to manufacturing the MEMS microphone only.

The (unpublished) process described above forming a 1D accelerometer has been proposed for body noise compensation (reduction of structure borne sound). However, with some minor additions, the technology can be used to make a full-functional 3D accelerometer with more options than body noise compensation only.

The additional approach of the invention is to electrically split either the back-electrode or the membrane into quadrants (referred to as segmented electrodes). It is then possible to derive both a z-axes signal and individual x- and y-axes signals, by reading out the multiple capacitances differentially, or in common mode. Several embodiments to achieve this in the current technology are below.

The invention thus has applications extending beyond loudspeaker/microphone applications. Even when not made on the same die as a microphone, the investments made for the microphone fabrication are re-used.

Figure 3:
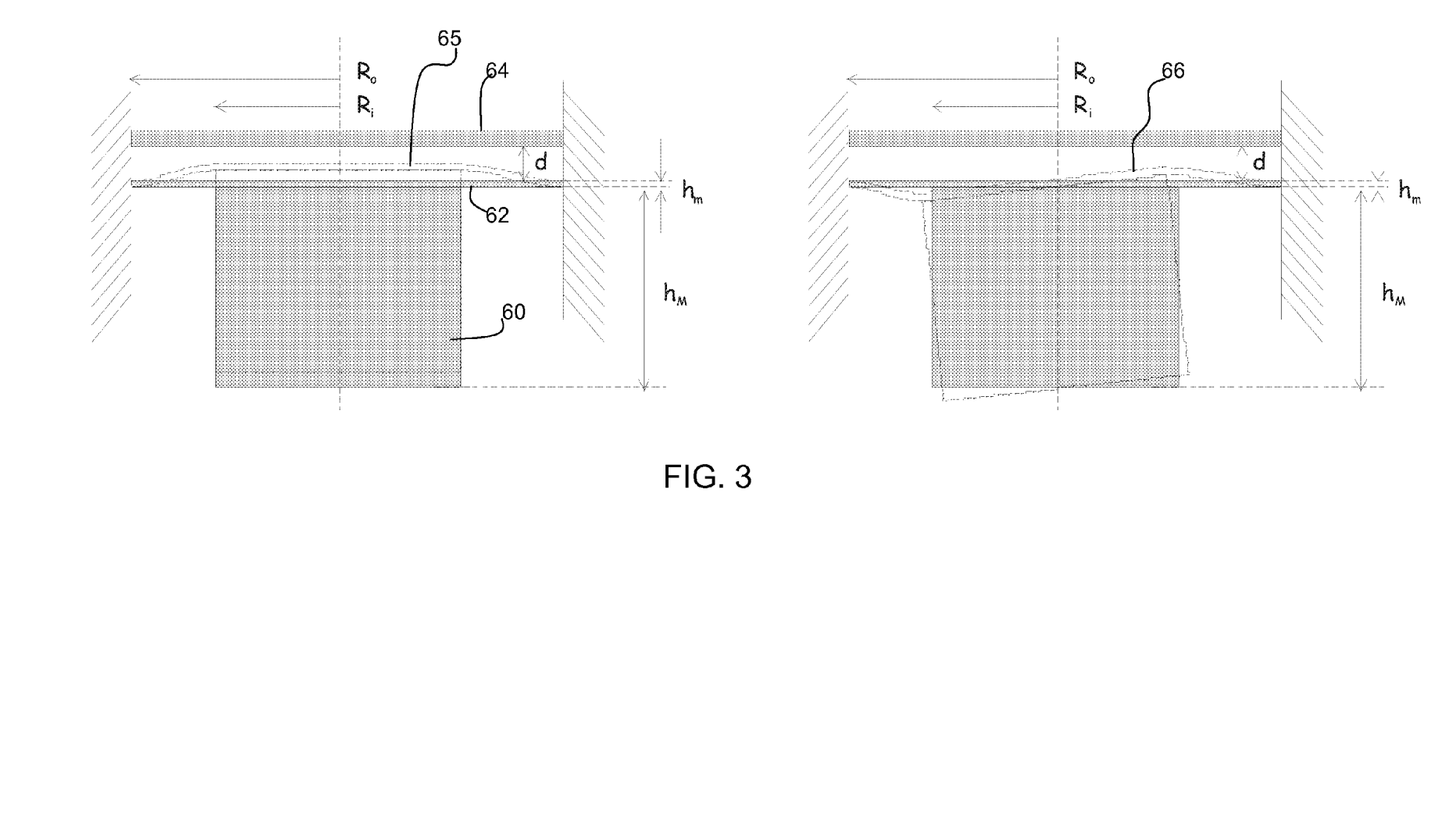
FIG. 3 is used to explain how three dimensional acceleration sensing can be possible using the approach of the invention.

FIG. 3 shows the operational mode of a one axis (one dimensional) accelerometer. FIG. 3 also shows that the accelerometer mass ("proof mass") can include not only a portion of the membrane but also an attached portion of the underlying lower silicon layer, by using the back etching of the substrate to isolate a portion of the substrate. This provides an increased mass for the accelerometer compared to the process shown in FIG. 2. Furthermore, it lowers the centre of gravity of the mass to which the external acceleration force is applied, so that rotational forces are induced by in-plane forces. The effect of these rotational forces is explained with reference to FIG. 3.

The square 60 represents a side view of the proof mass made in the bulk silicon. It is suspended from the membrane layer 62 which is for example used to make a circular spring. Capacitive read-out is enabled by making the back-plate 64 parallel to the membrane layer 62. The result is that an applied acceleration along the z-axis results in a displacement of the mass as shown in the left-hand picture in the dotted position 65. The air-gap d will be either reduced or increased (depending on the direction of the acceleration), and so the read-out capacitance will be changed resulting into the desired electrical signal. The displacement is given by $\Delta d = a \cdot M/k$ with "M" the proof mass, "k" the spring constant of the suspension and "a" the applied acceleration.

However, an acceleration in either the x-axis or y-axis, as shown in the right-hand part of FIG. 3, will result in a tilt of the proof mass due to the top-side suspension. The average spacing d remains the same so that the capacitive read out cannot detect this tilting.

The additional approach of the invention is to divide either the backplate, or the membrane or both into a number (e.g. 4) of quadrants.

Figure 4:
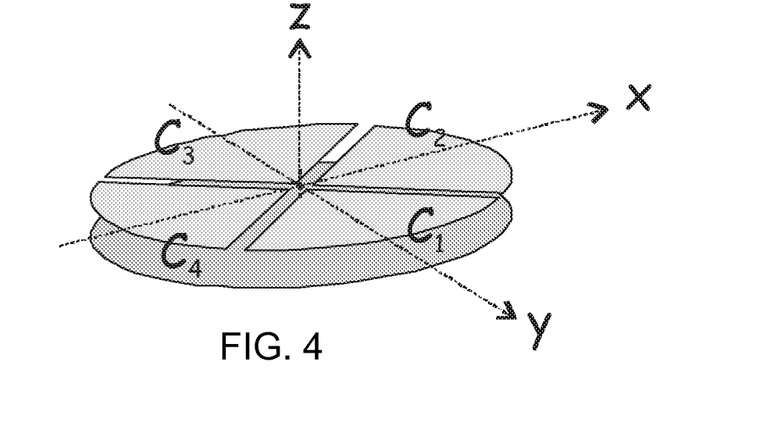
FIG. 4 shows a first possible electrode arrangement for use in the accelerometer design of the invention.

The electrode segmentation is more clearly illustrated in the perspective sketch of FIG. 4. In this case, either the backplate or the membrane is structured into four segments and the membrane or backplate (respectively) is not. Assuming the backplate is segmented, then there are four capacitances:

$C_1$ is one segment of the backplate with respect to the membrane $C_2$ is another segment of the backplate with respect to the membrane $C_3$ is another segment of the backplate with respect to the membrane $C_4$ is another segment of the backplate with respect to the membrane For an acceleration along the x-axis, the mass will tilt in such a way that $C_2$ and $C_4$ are changed, but $C_1$ and $C_3$ are not. An acceleration along the y-axis will change $C_1$ and $C_3$, while $C_2$ and $C_4$ remain unaltered. In pseudo notation (to indicate simply which acceleration components contribute to which changes in capacitance):

$$\Delta C_1 = a_y + a_z;$$

$$\Delta C_2 = a_x + a_z;$$

$$\Delta C_3 = -a_y + a_z;$$

$$\Delta C_4 = -a_x + a_z.$$

So:

$C_1+C_2+C_3+C_4$ determines the z-axis signal;
$C_2-C_4$ determines the x-axis signal;
$C_1-C_3$ determines the y-axis signal.

Figure 5:
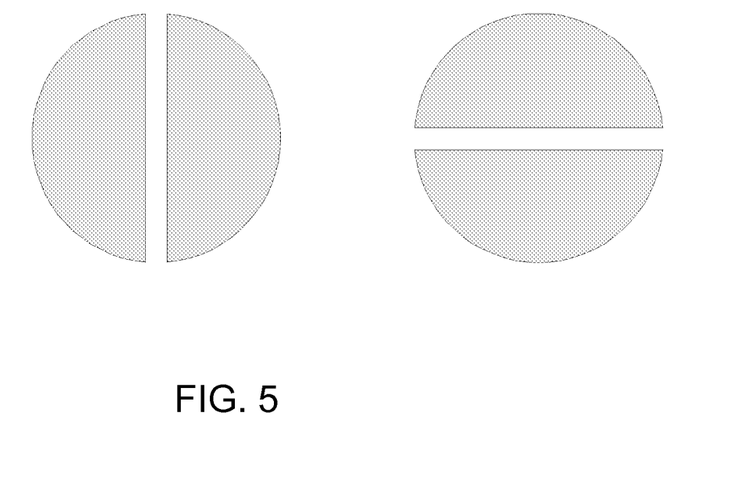
FIG. 5 shows a second possible electrode arrangement for use in the accelerometer design of the invention.

FIG. 4 shows a single arrangement of four quadrants. An alternative shown in FIG. 5 is to form two separate accelerometers on the same die with each two having semi-circle shaped electrodes, where the accelerometers are rotated 90 degrees with respect to each other to implement x and y-axis sensitivity. This is mechanically more stable than the four quadrant solution but requires a larger die area.

There are many different methods to make the required electrical segmentation in the layers, while not altering the mechanical stability.

In the original microphone stack, the backplate is a polysilicon doped layer (layer 40 in FIG. 2), so the backplate is a conductive element itself. The silicon membrane (the top silicon layer of the SOI structure) is a conductive element as well due to the applied doping level.

Thus, patterning of either the backplate or membrane (or both) is required to make separate electrodes.

Figure 6:
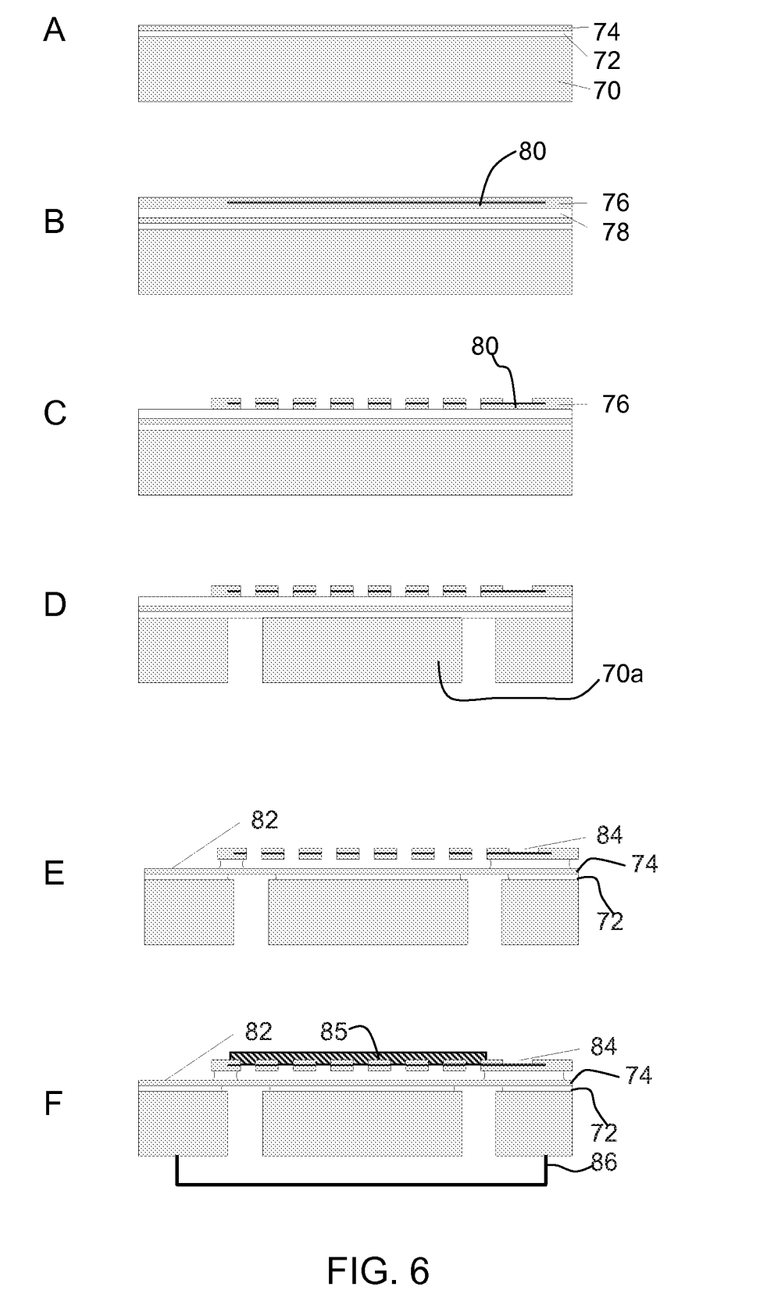
FIG. 6 shows a first example of method for producing segmented electrodes in the accelerometer of the invention.

A first example is shown in FIG. 6.

FIG. 6A shows the SOI substrate as the starting point (the same as FIG. 2A), with the bulk silicon substrate 70, buried oxide layer 72 and doped polysilicon top layer 74.

FIG. 6B shows a new backplate stack 76 provided over a $SiO_2$ sacrificial layer 78. The backplate layer comprises an insulator-conductor-insulator structure. The conductive layer 80 is used to define four local electrodes, while the insulator defines an electrically insulating suspension layer, which is used to make the backplate mechanically one unity.

In one example, the backplate stack can comprise a silicide, with a local implant to define the conductive layer. Leakage currents between the electric plates and undoped backplate areas have to be minimised by correct electrical reverse biasing. Other insulator-conductor-insulator structures can of course be used.

The conductor 80 in FIG. 6B is defined with the desired electrode shape, for example four quadrants.

In FIG. 6C, the backplate structure is patterned to define the required sacrificial etch through holes, and to provide contact access to the layer 80. One such contact access is shown in FIG. 6C, but there will one for each electrode.

FIG. 6D shows the backside DRIE etch process. This isolates a portion 70a of the bulk substrate.

The sacrificial etch shown in FIG. 6E removes the $SiO_2$ layer 78 through the patterned backplate structure and also removes the SOI buried insulator where it has been exposed by the backside etch. The resulting structure thus has a membrane electrode 82 and a set of backplate electrodes, one of which 84 is shown. The portion 70a of the bulk silicon substrate remains attached to the membrane 74 (through the buried oxide layer 72) whereas the support for that portion 70a is provided only by portions of the membrane layer 74.

By using a backplate stack having a separate conductor definition and a separate mechanical shape definition, the electrodes can have a shape which is different from the overall geometry. Thus, an electrode configuration as shown in FIG. 4, of four segments is an option. In addition, parasitic capacitances can be removed.

FIG. 6E shows the possible end product. However, because the backplate consists of several electrodes that are embedded in insulating material, no holes or slits are needed for the segmentation of the backplate electrode. As a result, an insulating layer can be deposited over the full stack as a final processing step, filling the etch holes in the backplate and, hence, creating a cavity, possibly at low pressure.

This option is shown in FIG. 6F, in which the insulating cover layer is shown as 85. By closing off the backside of the device by a dedicated package 86 in a low-pressure (vacuum) environment, the accelerometer is shielded from moisture and has reduced air damping. In order to ensure that the cavities above and below the membrane 74 are at the same low pressure, a pressure equalisation hole will be needed in the membrane, which is not shown.

Figure 7:
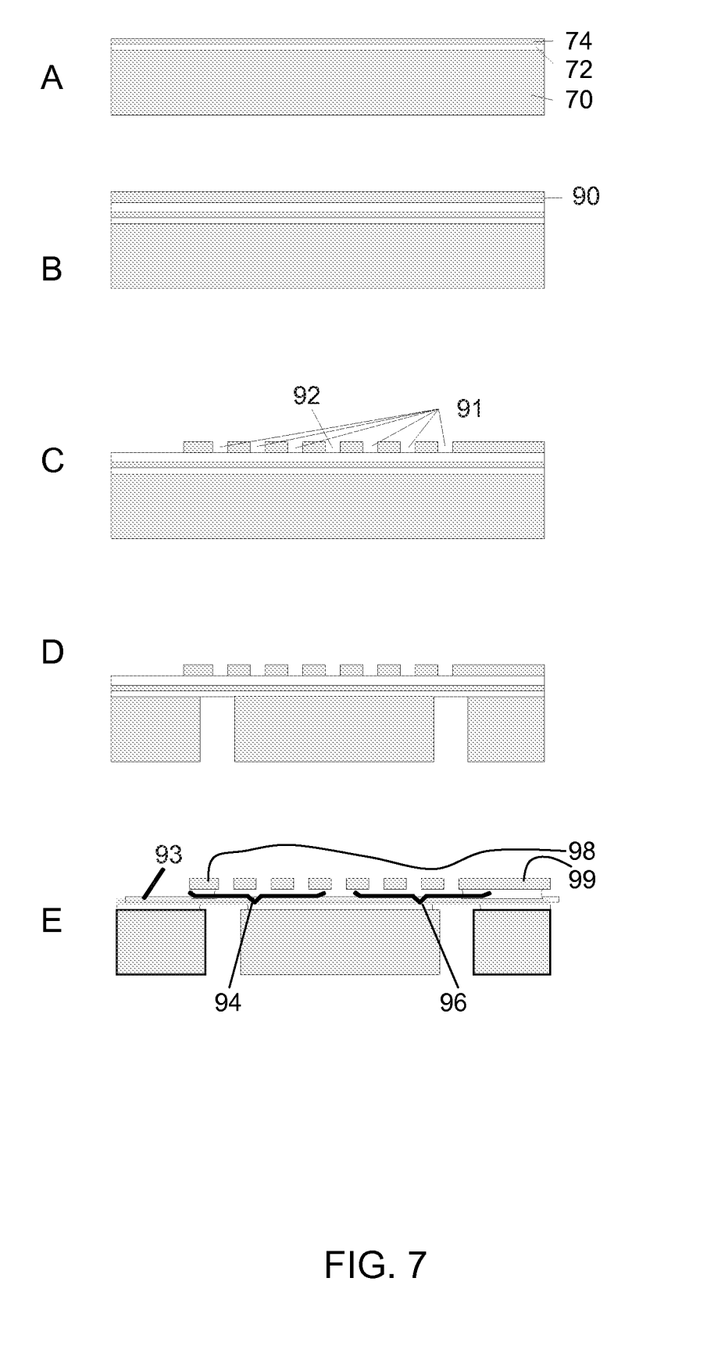
FIG. 7 shows a second example of method for producing segmented electrodes in the accelerometer of the invention.

A second example is shown in FIG. 7.

FIG. 7A shows the same starting point as FIG. 6A.

FIG. 7B shows the doped polysilicon backplate layer 90 applied, and the patterning is shown in FIG. 7C. In this case, the patterning not only provides sacrificial etch holes, but also provides mechanical separation of different backplate electrodes. In particular, the backplate has slits 92, so that four backplate electrode quadrants are defined, each suspended only form the rim.

The backside etch is shown in FIG. 7D followed by the sacrificial etch in FIG. 7E. The resulting structure thus has four backplate electrodes, each with a contact defined at the rim. Two such electrodes 94,96 are shown as well as two backplate contacts 98,99.

Figure 8:
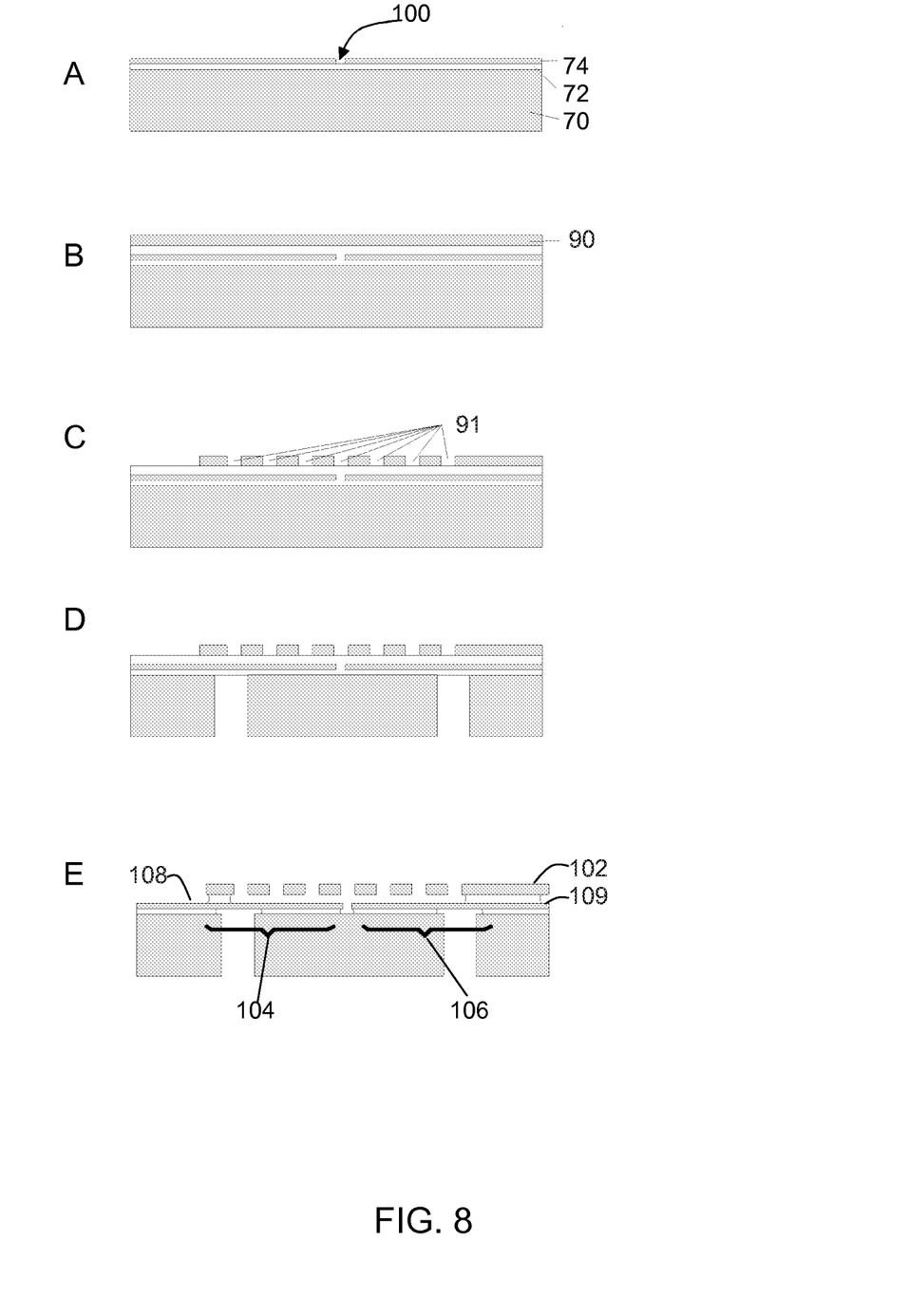
FIG. 8 shows a third example of method for producing segmented electrodes in the accelerometer of the invention.

A third example is shown in FIG. 8.

FIG. 8A shows the same starting point as FIG. 6A, but the top silicon layer is patterned with physical slits 100 to define separate the membrane into different areas. The whole structure is held together by the suspended proof mass. The microphone process already includes patterning of the top silicon layer.

FIG. 8B shows the doped polysilicon backplate layer 90 applied, and the patterning is shown in FIG. 8C to provide the sacrificial etch holes 91. The backside etch is shown in FIG. 8D followed by the sacrificial etch in FIG. 8E. The resulting structure thus has a single backplate electrode with its associated backplate contact 102, but four membrane electrodes are defined. Two such electrodes 104,106 are shown as well as the associated membrane contacts 108,109.

Thus, the membrane layer or the backplate can be patterned to define segmented electrodes. The electrodes can be divided into four, but it is equally possible to provide more electrodes and this may enable xy directional sensing with greater accuracy. There are at least four separate capacitances which can be monitored, but these may be split over multiple accelerometer units as explained above.

To given an example of suitable dimensions, an accelerometer with a membrane diameter of 300 μm has been evaluated with respect to specifications and costs. This size is comparable with stand alone accelerometers already in the market.

In the Z-axis, the device functions as a single large electrode 300 μm in diameter. For example, with a wafer thickness of 365 μm, the capacitance is 313 fF with a changes in capacitance for an acceleration of 1 g of 82 aF (dx=1 nm).

In the XY-axes, the individual capacitances are 78 fF and the changes in capacitance for 1 g acceleration is 53 aF (dx=3.5 nm). Thus, the sensitivity to xy acceleration is lower, but the suitability for three axis acceleration sensing has been demonstrated.

The invention provides a method to produce a 3D capacitive accelerometer based on the processing already used for microphone manufacture. By re-using the flow it is possible to benefit from the factory investments already made for microphones, even when the accelerometer is not to be made on the same die in the envisioned product. This makes the use of a bulk micromachining approach to be competitive.

It should be understood that the invention is thus not limited to the association of the accelerometer with a microphone product.

In the examples above, a portion of the lower bulk silicon is attached to the membrane, so that rotational forces are induced. However, a similar effect could be achieved by providing layers on top of the membrane.

As explained above, the at least four electrodes can be spread between multiple sensor units, which together define the "accelerometer" of the invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A MEMS accelerometer comprising:
   a substrate;
   a membrane suspended over an opening which extends through the substrate, wherein the membrane defines a first electrode layer; and
   a second electrode layer provided over the membrane and spaced from the membrane, wherein a force applied to the membrane normally to the membrane causes a change in spacing between the membrane and the second electrode layer;
   wherein the second electrode layer comprises a stack of a lower insulator, a conductor and a top insulator, and the conductor is patterned to define at least four independent electrodes arranged as a first pairs of opposing electrodes and a second pair of opposing electrodes;
   the first pair of opposing electrodes disposed along a first axis and the second pair of opposing electrodes disposed along a second axis, wherein the first axis is orthogonal to the second axis and wherein the first pair of opposing electrodes and the second pair of opposing electrodes are mechanically one unity and electrically split from each other, such that tilting of the membrane about the first axis and the second axis can be detected as well as normal-direction movement of the membrane, and wherein the membrane defines a single electrode.

2. The accelerometer as claimed in claim 1 further comprising a portion of the substrate attached to the membrane, which portion defines a suspended mass isolated from a remainder of the substrate by the opening through the substrate.

3. The accelerometer of claim 1, wherein the substrate comprises silicon.

4. The accelerometer of claim 1, wherein the second electrode layer comprises four quadrants.

5. The MEMS accelerometer of claim 1, wherein tilting of the membrane about the first axis changes the capacitance between the second pair of opposing electrodes and the membrane, and wherein tilting of the membrane about the second axis changes the capacitance between the first pair of opposing electrodes and the membrane.

6. The MEMS accelerometer of claim 5, wherein the first pair of opposing electrodes and the second pair of opposing electrodes are configured to remain in the same plane during tilting of the membrane.

7. A method of forming a MEMS accelerometer, comprising:
   manufacturing a substrate structure having a bulk semiconductor layer, an insulator layer over the bulk semiconductor layer and a top doped semiconductor layer;
   forming an electrode layer over a sacrificial layer, over the substrate structure;
   defining sacrificial etch holes in the electrode layer;
   forming an opening through the bulk semiconductor layer; and
   performing a sacrificial etch to define a gap between the electrode layer and the top doped semiconductor layer;
   forming at least four independent electrodes in the electrode layer, the at least four independent electrodes arranged as a first pair of opposing electrodes and a second pair of opposing electrodes, with the first pair of opposing electrodes formed along a first axis and the second pair of opposing electrodes formed along a second axis, wherein the first axis is orthogonal to the second axis;
   wherein the at least four independent electrodes are formed in the electrode layer as a single mechanical layer, wherein movement of one of the at least four independent electrodes causes movement of the other of the at least four independent electrodes; and
   wherein forming the electrode layer comprises forming a stack of a lower insulator, a conductor and a top insulator, and patterning the electrode layer to define the at least four independent electrodes.

8. The method as claimed in claim 7, wherein forming an opening through the bulk semiconductor layer comprises isolating a portion of the bulk semiconductor layer which is attached to the top doped semiconductor layer, thereby to define a suspended mass isolated from the remainder of the bulk semiconductor layer by the opening through the substrate structure.

9. The method as claimed in claim 7, wherein the electrode layer is patterned to comprise four quadrants.

10. The method as claimed in claim 7, wherein the substrate structure comprises a silicon-on-insulator substrate.

11. A MEMS accelerometer comprising:
    a substrate;
    a membrane suspended over an opening which extends through the substrate, wherein the membrane defines a first electrode layer; and
    a second electrode layer provided over the membrane and spaced from the membrane, wherein a force applied to the membrane normally to the membrane causes a change in spacing between the membrane and the second electrode layer;
    the first electrode layer and/or the second electrode layer patterned to form at least a first electrode segment, a second electrode segment, a third electrode segment, and a fourth electrode segment;
    wherein the first electrode segment and the third electrode segment are disposed along a first axis, and the second electrode segment and the fourth electrode segment are disposed along a second axis, wherein the first axis is orthogonal to the second axis;
    wherein the first electrode segment and the third electrode segment are mechanically one unity, and the second electrode segment and the fourth electrode segment are mechanically one unity;
    wherein the first electrode segment, the second electrode segment, the third electrode segment, and the fourth electrode segment are electrically isolated from each other.

12. The MEMS accelerometer of claim 11, wherein the first electrode segment, the second electrode segment, the third electrode segment, and the fourth electrode segment are patterned in the first electrode layer; and
   wherein capacitance between the first electrode segment and the second electrode layer, between the second electrode segment and the second electrode layer, between the third electrode segment and the second electrode layer, and between the fourth electrode segment and the second electrode layer provides a measure of: tilting of the membrane about the first axis and the second axis, and normal-direction movement of the membrane.

13. The MEMS accelerometer of claim 12, wherein the second electrode layer defines a single electrode.

14. The MEMS accelerometer of claim 11, wherein the first electrode segment, the second electrode segment, the third electrode segment, and the fourth electrode segment are patterned in the second electrode layer;
   wherein capacitance between the first electrode segment and the first electrode layer, between the second electrode segment and the first electrode layer, between the third electrode segment and the first electrode layer, and between the fourth electrode segment and the first electrode layer provides a measure of: tilting of the membrane about the first axis and the second axis, and normal-direction movement of the membrane; and
   wherein the first electrode layer defines a single electrode.

15. The MEMS accelerometer of claim 11, wherein the first electrode segment and the third electrode segment are patterned in the first electrode layer, and wherein the second electrode segment and the fourth electrode segment are patterned in the second electrode layer.

16. The MEMS accelerometer of claim 11, wherein the first to fourth electrode segments are configured to detect acceleration along three axes.

17. The MEMS accelerometer of claim 11, wherein:
   the first electrode segment and the third electrode segment are arranged as a first pair of opposing semi-circle electrodes; and
   the second electrode segment and the fourth electrode segment are arranged as a second pair of opposing semi-circle electrodes.

18. The MEMS accelerometer of claim 17, wherein:
   the first electrode segment and the third electrode segment are both patterned in the first electrode layer or are both patterned in the second electrode layer; and
   the second electrode segment and the fourth electrode segment are both patterned in the first electrode layer or are both patterned in the second electrode layer.

19. The MEMS accelerometer of claim 11, wherein the second electrode layer includes a first sensor unit and a second sensor unit;
   the first sensor unit including the first electrode segment and the second electrode segment, the first electrode segment and the second electrode segment disposed as a first pair of opposing semi-circle electrodes; and
   the second sensor unit including the third electrode segment and the fourth electrode segment, the third electrode segment and the fourth electrode segment disposed as a second pair of opposing semi-circle electrodes;
   wherein the first sensor unit is rotated 90 degrees with respect to the second sensor unit.

20. The MEMS accelerometer of claim 11, wherein the first electrode segment and the third electrode segment are configured to remain in the same plane during tilting of the membrane.

* * * * *